(12) United States Patent
Paniconi et al.

(10) Patent No.: US 7,894,527 B2
(45) Date of Patent: Feb. 22, 2011

(54) MULTI-STAGE LINKED PROCESS FOR ADAPTIVE MOTION VECTOR SAMPLING IN VIDEO COMPRESSION

(75) Inventors: Marco Paniconi, Campbell, CA (US); James J. Carrig, San Jose, CA (US); Zhourong Miao, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1527 days.

(21) Appl. No.: 11/229,230

(22) Filed: Sep. 16, 2005

(65) Prior Publication Data

US 2007/0064806 A1    Mar. 22, 2007

(51) Int. Cl.
*H04N 11/02* (2006.01)
*H04B 1/66* (2006.01)

(52) U.S. Cl. .............. 375/240.16; 375/240.29; 375/E7.105; 375/E7.119; 375/E7.211

(58) Field of Classification Search ............ 375/240.16, 375/240.29, E7.105, E7.119, E7.211
See application file for complete search history.

(56) References Cited

U.S. PATENT DOCUMENTS

| | | | |
|---|---|---|---|
| 4,922,341 A | 5/1990 | Strobach | |
| 5,047,850 A | 9/1991 | Ishii et al. | |
| 5,654,771 A | 8/1997 | Tekalp | |
| 5,872,866 A | 2/1999 | Strongin et al. | |
| 5,974,188 A | 10/1999 | Benthal | |
| 6,125,143 A * | 9/2000 | Suzuki et al. | 375/240.11 |
| 6,178,205 B1 | 1/2001 | Cheung et al. | |
| 6,208,692 B1 | 3/2001 | Song et al. | |
| 6,212,235 B1 | 4/2001 | Nieweglowski et al. | |
| 6,466,624 B1 | 10/2002 | Fogg | |
| 6,480,615 B1 | 11/2002 | Sun et al. | |
| 6,590,934 B1 | 7/2003 | Kim | |
| 6,591,015 B1 | 7/2003 | Yasunari et al. | |
| 6,608,865 B1 | 8/2003 | Itoh | |
| 6,690,729 B2 | 2/2004 | Hayashi | |

(Continued)

FOREIGN PATENT DOCUMENTS

WO    WO 00/16563 A1    3/2000

(Continued)

OTHER PUBLICATIONS

Leymarie et al, Tracking Deformable Objects in the Plane Using an Active Contour Model, IEEE Trans. on Pattern Analysis and Mach. Intel., vol. 15 No. 6, Jun. 1993, pp. 617-634.

(Continued)

*Primary Examiner*—Bhavesh M Mehta
*Assistant Examiner*—Stephen R Koziol
(74) *Attorney, Agent, or Firm*—Blakely, Sokoloff, Taylor & Zafman LLP (57) ABSTRACT

A method of filtering an image includes receiving target image data and applying a multiple stage filter to the target image data. Each stage of the filtering includes generating a motion vector sampling pattern, using the target image data and the motion vector sampling pattern to generate a temporal prediction of the target image data, and using the temporal prediction of the target image data to generate a spatial-temporal transformation of the target image data.

15 Claims, 9 Drawing Sheets

U.S. PATENT DOCUMENTS

| | | |
|---|---|---|
| 6,754,269 B1 | 6/2004 | Yamaguchi et al. |
| 6,765,965 B1 | 7/2004 | Hanami et al. |
| 6,782,054 B2 | 8/2004 | Bellers |
| 6,864,994 B1 | 3/2005 | Harrington |
| 6,996,186 B2 * | 2/2006 | Ngai et al. ............. 375/240.29 |
| 7,110,455 B2 * | 9/2006 | Wu et al. ................ 375/240.16 |
| 2004/0057517 A1 | 3/2004 | Wells |
| 2004/0062307 A1 | 4/2004 | Hallapuro et al. |
| 2004/0131267 A1 | 7/2004 | Adiletta et al. |
| 2004/0233991 A1 | 11/2004 | Sugimoto et al. |
| 2005/0100092 A1 | 5/2005 | Sekiguchi et al. |
| 2005/0135483 A1 | 6/2005 | Nair |
| 2005/0265452 A1 * | 12/2005 | Miao et al. ............. 375/240.16 |
| 2006/0140273 A1 * | 6/2006 | Wu ........................ 375/240.16 |

FOREIGN PATENT DOCUMENTS

| | | |
|---|---|---|
| WO | WO 01/78402 A1 | 10/2001 |
| WO | WO 02/37859 A2 | 5/2002 |
| WO | WO 2004/047454 A1 | 6/2004 |
| WO | WO 2005/069629 A1 | 7/2005 |

OTHER PUBLICATIONS

Reshef et al, Low Bit-Rate Video Coding Using Iterave Affine Motion Estimation and Quadtree Segmentation, Proc. Int'l Conf. on Dig. Signal Processing, Jun. 1995 pp. 427-431.

Chang et al, Simultaneous Motion Estimation and Segmentation, IEEE Transactions on Image Processing, vol. 6 No. 9, Sep. 1997, pp. 1326-1333.

Zhang et al, Image Sequence Segmentation Using 3-D Structure Tensor and Curve Evolution, IEEE Trans. on Circuits and Sys. For Video Tech., vol. 11 No. 5, May 2001, pp. 629-640.

Orchard et al, Overlapped Block Motion Compensation: An Estimation-Theoretic Approach, IEEE Transactions on Image Processing, vol. 3 No. 5, Sep. 1994, pp. 693-699.

Du et al, Two Dimensional Hierarchical Mesh Based Video Compression Techniques, 6th Int'l Symposium on DSP for Communication Systems, 2002, Sydney Australia, pp. 247-252.

* cited by examiner

MULTI-STAGE LINKED PROCESS FOR ADAPTIVE MOTION VECTOR SAMPLING IN VIDEO COMPRESSION

FIELD OF INVENTION

The invention is related to the field of video compression.

BACKGROUND

In video coding, a compression process typically involves a residual filter for spatial filtering and a temporal prediction filter. The residual filter may use a discrete cosine transform (DCT), wavelet, or a lifting transform. The temporal prediction filter allows a target image to be predicted from a set of reference images (usually 1 or 2). The temporal prediction filter uses a set of motion vectors that represent an object that has changed position in the target image relative to the reference images (i.e., moved) and a filter that operates over the motion vector data. Standard approaches to temporal prediction use a regular or uniform pattern of motion vectors to perform simple motion compensation for each block represented by the motion vector.

There is a trend toward using an irregular motion vector pattern in the target image. An irregular pattern of motion vectors arises from adapting the motion vector positions in the target image (e.g., more motion vectors near moving object boundaries, fewer in background regions) in order to improve the temporal prediction. Generating the irregular motion vector pattern is often a highly complex procedure, however, and is typically performed on the target image without regard to the effects of spatial-temporal filtering. This process is not desirable as there may significant overlap between the effects of spatial-temporal filtering and irregular motion vector sampling.

For example, certain regions of the image, even though they may have complex motion, may be very easily filtered because the spatial correlation is very high. Hence, these regions do not require an irregular distribution of motion vectors. Because a simple, uniform pattern of motion vectors can be used to avoid the complexity cost of generating the irregular motion vector pattern. Conventional approaches are unable to link the generation of an irregular motion vector pattern with the results of spatial-temporal filtering.

SUMMARY

A method of filtering an image includes receiving target image data and applying a multiple stage filter to the target image data. Each stage includes generating a motion vector sampling pattern, using the target image data and the motion vector sampling pattern to generate a temporal prediction of the target image data, and using the temporal prediction of the target image data to generate a spatial-temporal transformation of the target image data.

BRIEF DESCRIPTION OF THE DRAWINGS

The present invention is illustrated by way of example and may be better understood by referring to the following description in conjunction with the accompanying drawings, in which.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. For example, skilled artisans will understand that the terms field or frame or image that are used to describe the various embodiments are generally interchangeable as used with reference to video data. Similarly, skilled artisans will understand that the terms "regular distribution of motion vectors" and "uniform distribution of motion vectors" are generally interchangeable, and the terms "irregular pattern of motion vectors" and "adaptive pattern of motion vectors" are generally interchangeable as used with reference to video data.

A method of linking motion vector pattern generation with spatial-temporal prediction applies a spatial-temporal transform to a target image over multiple stages. The transform processes spatial data from a target image and temporal data from a predicted image. In the first few stages of the method, the spatial data in the target image is highly correlated. In other words, spatial data from one portion of an image usually provides an accurate prediction of spatial data in an adjacent portion of the image. Hence, the early stages of the method rely on spatial prediction more than on temporal prediction. For example, in the early stages the patterns of motion vectors that are generated are distributed in a regular pattern, or a nearly regular pattern. A pattern of motion vectors is regular when the motion vectors are evenly distributed across the target image at uniform intervals.

In the later stages of the method, the spatial correlation is reduced because of the effects of the low pass filtering. The patterns of motion vectors that are generated in the later stages are therefore irregular in order to rely on temporal prediction more than on spatial prediction. By initially predicting the target image using spatial data and a regular pattern of motion vectors, a compressed version of the target image is available for further compression using an irregular pattern of motion vectors and temporal data. As a result, generating the irregular pattern of motion vectors for a partially compressed target image, which has a smaller size, is less complex than generating the irregular pattern for the complete target image.

Figure 1:
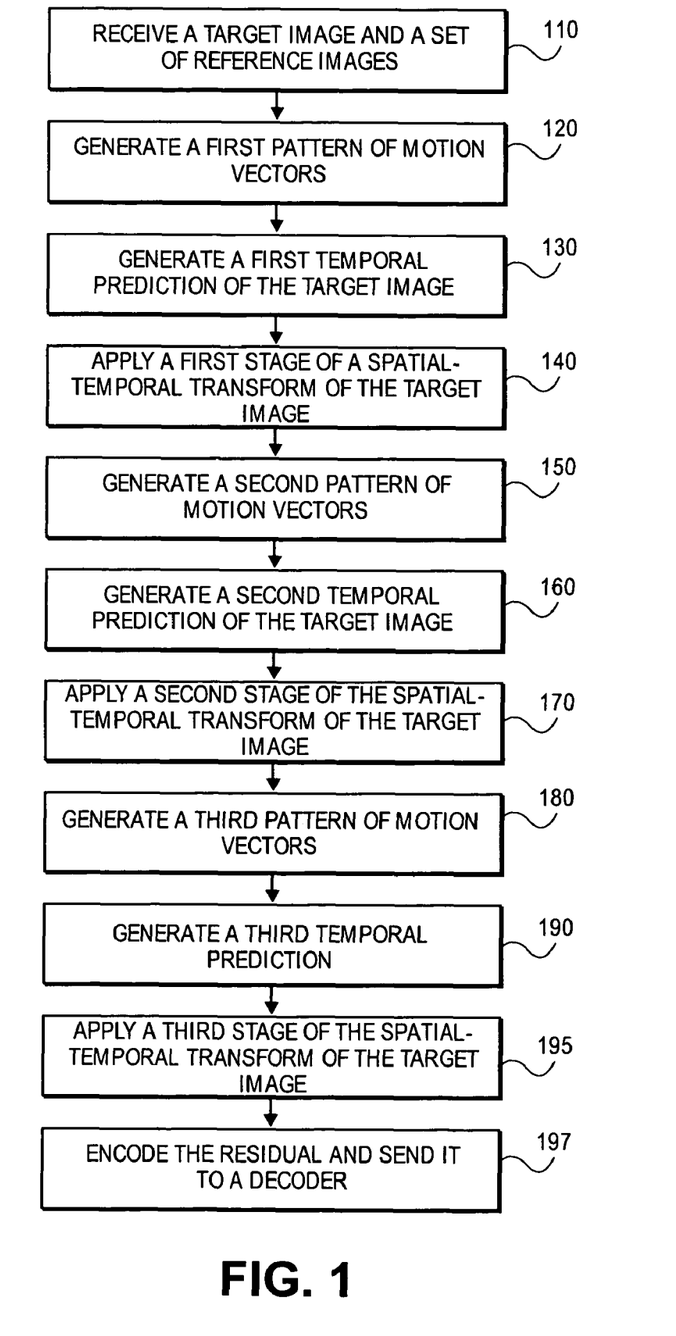
FIG. 1 shows an example of a linking method.

An example of a multi-stage linking method is shown in FIG. 1. At 110, an encoder receives an input target image and a set of one or more reference images. Each reference image contains previously decoded data, and is available to both the encoder and the decoder. At 120, the encoder generates and applies a first sampling pattern of motion vectors to the target image. In this example, the sampling pattern is regular because the spatial correlation on the target image is initially strong At 130, an adaptive temporal prediction filter uses the target image, the regular pattern of motion vectors, and the set of reference images to generate a first prediction of the target image. An example of an adaptive temporal prediction filter is an adaptive area of influence (AAOI) filter, which is discussed below. At 140, a first stage of a spatial-temporal transform is applied to the target image and the first prediction to produce a first transformation of the target image. In some embodiments, the first transformation includes first low pass data and first high pass data of the target image.

At 150, the encoder generates and applies a second pattern of motion vectors to the first low pass data of the target image. In this example, the second sampling pattern is less regular than the first sampling pattern because some spatial correlation is lost in the first low pass data due to the averaging process of the first stage transform. At 160, the adaptive temporal prediction filter uses the irregular sampling pattern of motion vectors, the first low pass data of the target image, the set of reference fields, and the first prediction to generate a second prediction of the target image. At 170, the second stage of the spatial-temporal transform is applied to the first low pass data of the target image and the second prediction to produce a second transformation of the target image. In some embodiments, the second transformation includes second low pass data and second high pass data.

At 180, given the second low pass data of the target image produced by the second stage transform, the encoder generates a third pattern of motion vectors. In this example, the third pattern is even more irregular than the second pattern because more spatial correlation is lost due to averaging process of the second stage transform. At 190, the adaptive temporal prediction filter uses the third, irregular pattern of motion vectors, the second low pass data of the target image, the set of reference images, and the second prediction to generate a third prediction. At 195, the third stage of the spatial-temporal transform is applied to the third prediction and the second low pass data to generate a third transformation of the target image, which includes third low pass data. At 197, the third low pass data, which in this example is the final residual, is entropy coded, and the coded coefficients are sent to a decoder. FIG. 1 shows an example of a multi-stage linking method having three stages. In general, the multi-stage linking method may be applied for any number of stages, and the number of stages may be fixed or modified for each target image to maximize compression.

Figure 2:
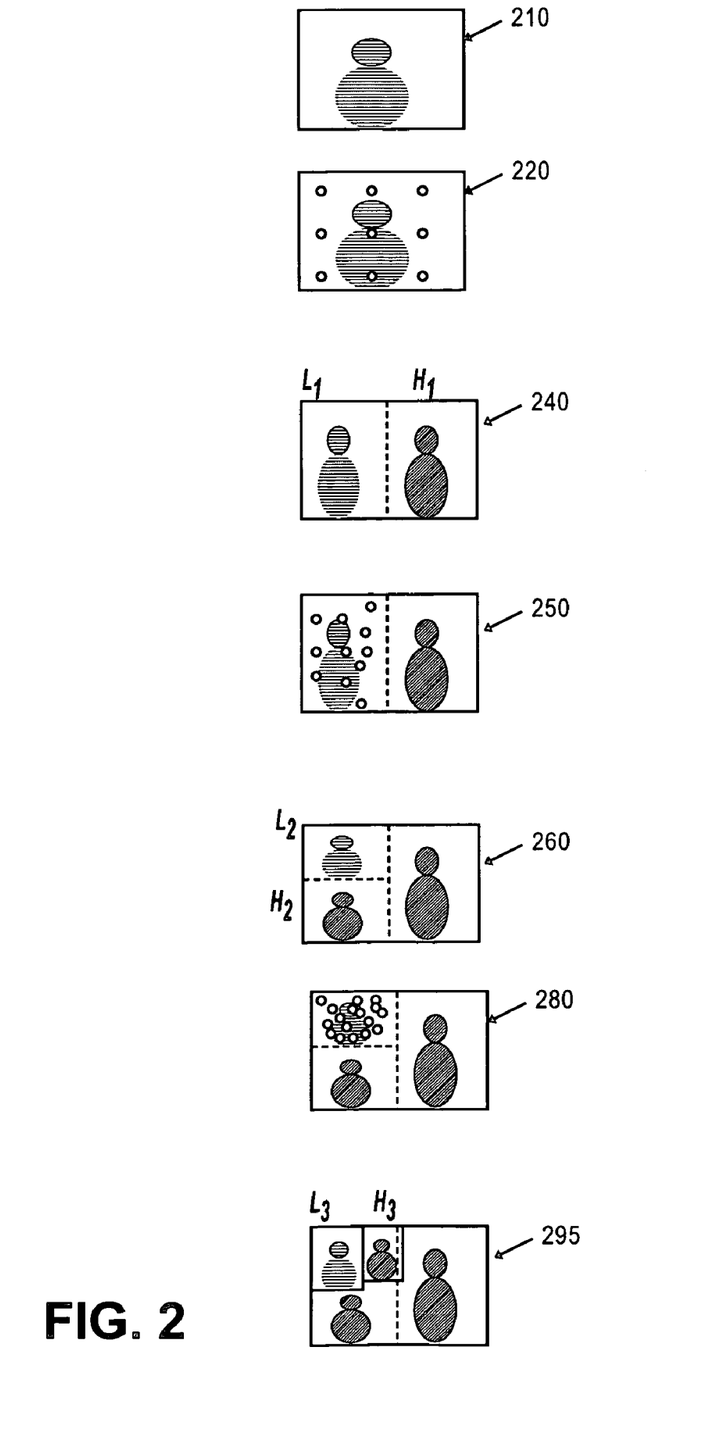
FIG. 2 shows an example of the intermediate results produced by the method of FIG. 1.

An example of the intermediate results produced by the method of FIG. 1 is shown in FIG. 2 for three stages. Block 210 shows a target image that is received by the encoder. The target image has a high degree of spatial correlation before it is filtered. Therefore, as shown in block 220, a regular pattern of motion vectors is applied to the target image and input to the adaptive temporal prediction filter to produce the first prediction. The first stage of the spatial-temporal transform uses the first prediction and the target image to produce the first transformation, including first low pass data $L_1$ and first high pass data $H_1$, as shown in block 240. An example of low pass data is averaged or compressed data, and an example of high pass data is residual data obtained from the original target image minus a prediction of the target image.

An irregular pattern of motion vectors is generated and is applied to the first low pass data $L_1$ of the target image, as shown in block 250. The adaptive temporal prediction filter then produces a second prediction using the first low pass data, the first prediction, and the irregular pattern of motion vectors. The second stage of the spatial-temporal transform uses the second prediction and the first low pass data to produce a second transformation, including second low pass data $L_2$ and second high pass data $H_2$, as shown in block 260.

The amount of the second low pass data is small compared to the amount of data of the initial target image shown in block 210. As a result, generating an irregular pattern of motion vectors for the second low pass data is less complex than generating the irregular pattern for the initial target image. Also, the spatial correlation of the second low pass data is much lower than the spatial correlation of the target image 210. Hence, a prediction for the second low pass data is more accurate when it relies on temporal data more than spatial data. Therefore, an irregular pattern of motion vectors is generated and applied to the second low pass data, as shown in block 280.

The second low pass data, the second prediction, and the non-uniform pattern of motion vectors are used by the adaptive temporal prediction filter to generate a third prediction. The third prediction and the second low pass data are used by the spatial-temporal transform to generate a third transformation, including third low pass data $L_3$, as shown in block 295. The method shown in FIG. 2 illustrates how generating the pattern of motion vectors is interleaved with the spatial-temporal filtering. At each stage, the motion vector sampling pattern is adapted to the spatial correlation of the target image data at that stage. The adaptive sampling pattern provides a higher density of motion vectors in moving object regions, and a lower density of motion vectors in background regions. The spatial correlation is generally stronger at early stages and weaker at later stages. Therefore, the example of FIG. 2 shows a regular pattern of motion vectors at stage one (where we can rely more on the spatial prediction), and more complex motion vector patterns at higher stages (where we rely more on the temporal prediction).

Figure 3:
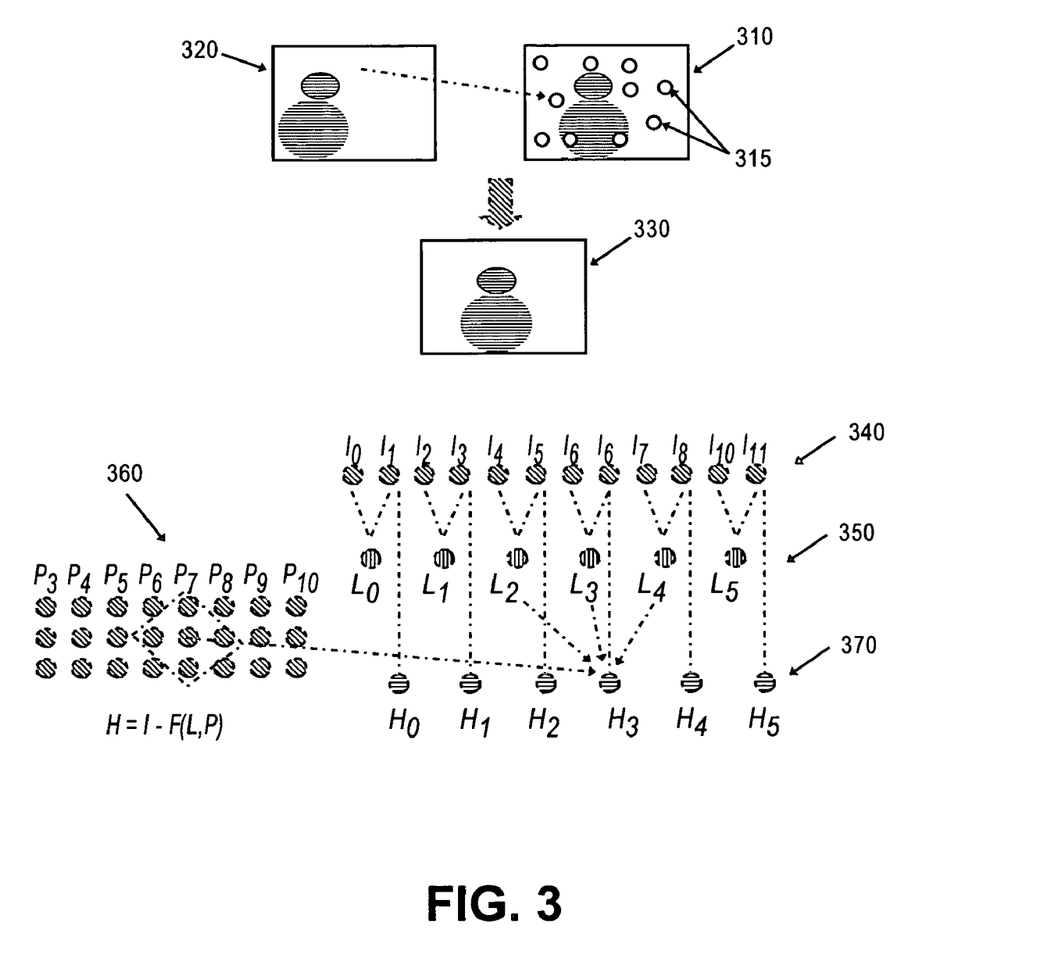
FIG. 3 shows an example of a spatial-temporal transform used in the method of FIG. 1.

Referring to 140 of FIG. 1 in greater detail, an example of the spatial-temporal transform is shown in FIG. 3. A pattern of motion vectors 315 is distributed in a target image 310. The motion vectors and reference image 320 are used by an adaptive temporal prediction filter to generate a temporal prediction 330. A spatial-temporal transform is applied to the temporal prediction and the target image. For example, a row of pixels 340 from the target image are filtered by a low pass filter to generate low pass data 350. The low pass data and pixels 360 from the temporal prediction are used by a high pass prediction filter to generate high pass data 370.

Figure 4:
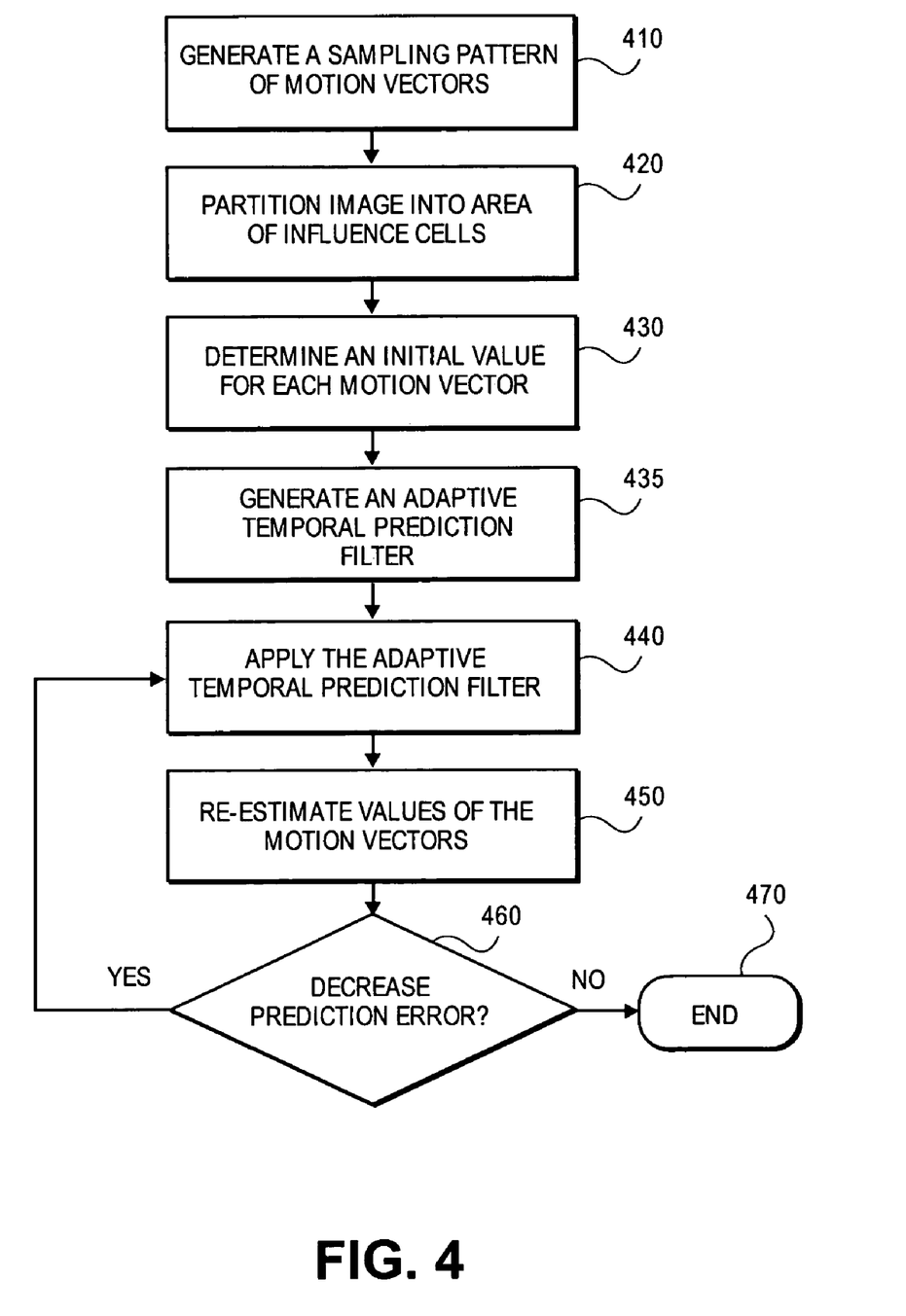
FIG. 4 shows an example of an adaptive temporal filtering procedure used in the method of FIG. 1.

Referring to 130, 160, and 190 of FIG. 1 in greater detail, an example of a process that implements the adaptive temporal prediction filter is shown in FIG. 4. The adaptive temporal prediction filter is applied to a pattern of motion vectors, which can be regular, or irregular, to produce a prediction of a target image. In one embodiment, each estimate of a motion vector is determined relative to a tap structure of the adaptive temporal filter for the irregular pattern. The estimate is made in two stages. In the first stage, an initial estimation of the motion vector, independent of the filter's tap structure, is determined. In the second stage, the tap structure is used during a re-estimation of the value of each motion vector. The tap structure that is applied to a particular motion vector is generated from a local pattern of neighboring motion vectors, to include their effects in the estimate of the particular motion vector. In some embodiments, an adaptive pixel influence area and an adaptive search window are used to reduce the complexity of performing the re-estimation process. An example of a method to estimate the value of a motion vector relative to the adaptive temporal filter is described in co-pending U.S. application Ser. No. 11/228,681, entitled ADAPTIVE MOTION ESTIMATION FOR TEMPORAL PREDICTION FILTER OVER IRREGULAR MOTION VECTOR SAMPLES by Marco Paniconi et al., concurrently filed with the present application and incorporated herein by reference.

An example of the adaptive temporal filtering procedure is shown in FIG. 4. At 410, a sampling pattern of motion vectors is generated for an image. Such patterning may be done in various ways using methods that are known to those of skill in the art.

Figure 5:
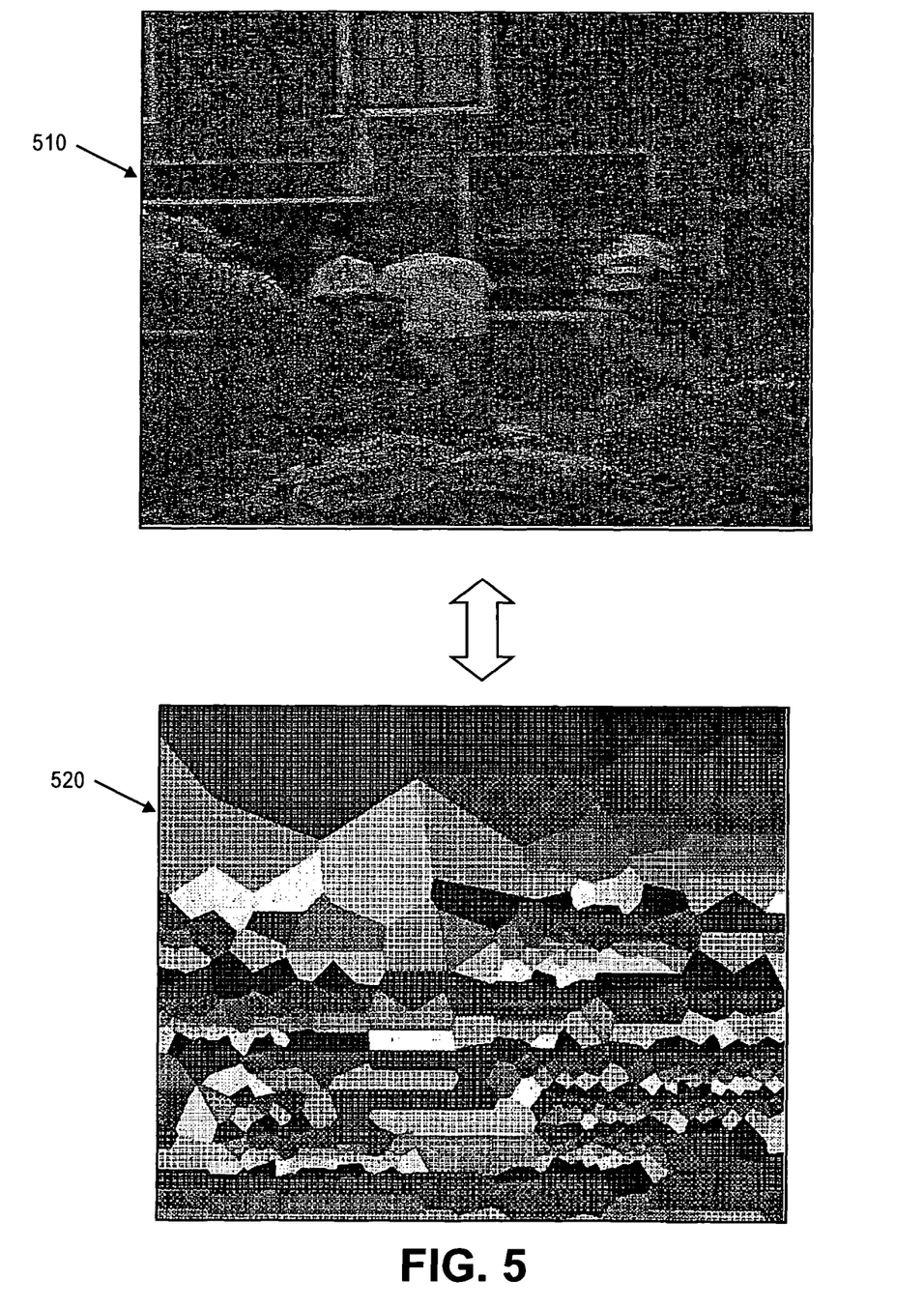
FIG. 5 shows an example of a pattern of motion vectors used in the method of FIG. 4.

An example of a sampling pattern of motion vectors generated at 410 is the irregular pattern shown in block 510 of FIG. 5. The white dots in the image 510 represent the motion vectors. With an irregular, or adaptive sampling pattern, the motion vectors are more concentrated in regions that are difficult to predict from the reference image (i.e., image regions with more complex motion, such as regions near moving boundaries). Fewer motion vectors are placed in simple motion regions, such as image background regions.

Returning to FIG. 4, at 420 the image is partitioned into multiple cells, called area of influence cells (AOI cells), where each AOI cell has one motion vector as its node. For example, the image 510 of FIG. 5 is partitioned into AOI cells as shown at block 520. Each AOI cell represents a region that is influenced more by the motion vector inside of the cell than by any other motion vector in the image. Because an AOI cell is generated for each motion vector, the size of the AOI cells may be related to features of objects in the image, such as boundary regions. For example, AOI cells near a boundary region between objects may be smaller than AOI cells in an image background region. Also, the shape of the AOI cell can be locally modified to adapt to the shape of an object's boundary. One embodiment of a method for generating AOI cells is a distance nearest motion vector partitioning method. Other partitioning methods may be used, such as block or triangular methods.

Returning to FIG. 4, at 430 an initial value for each motion vector is determined. At 435 an adaptive temporal prediction filter is generated for predicting the pixels in the target image using the irregular pattern of motion vectors and the area of influence cells. The prediction filter operates in the time-domain over motion compensated signals. In particular, the filter predicts a target pixel by using a weighted sum of different motion compensated signals, where each motion compensated signal is obtained by applying a different motion vector to predict the target pixel. The filter coefficients and tap structure change for each pixel in accordance with the changing pattern of motion vectors. Also, the support of the filter is local. This means that the motion vectors used to compensate a target pixel are obtained from the local neighborhood of that pixel.

The filter has the following structure. Let $\{v_j\}$ denote the set of N motion vectors, and I(x) the reference image (a previously decoded image). Let S(x) denote some set of motion vectors surrounding the location of pixel x. The prediction of that target pixel x can be generally expressed as:

$$I^{pred}(x) = \sum_{i \in S(x)} f_i I^{ref}(x + v_i)$$

where $\{f_i\}$ is a set of filter coefficients, and $x+v_i$ is the motion compensated pixel when motion vector $v_i$ is applied to pixel x. The support or tap of the filter is defined by the set S(x). The tap support S(x) and the filter coefficients $\{f_i\}$ are, in general, functions of the pixel position x and its neighboring motion vectors. That is, the filter coefficients can change for each pixel because the distribution of motion vectors changes throughout the image. Hence, the filter locally adapts to the changing motion vector pattern.

At 440, the prediction filter is applied to the target image to perform temporal prediction for the target image. The filter is applied in the time domain to generate a prediction result for the target image given the set of motion vector values and sampling pattern. The filter uses a filter tap and filter coefficients that are defined by an area of overlapping regions to capture the relevance of motion vectors neighboring a pixel to be predicted. An example of this class of prediction filters is an area of influence filter disclosed in co-pending U.S. application Ser. No. 11/229,284 entitled ADAPTIVE AREA OF INFLUENCE FILTER by Marco Paniconi et al., concurrently filed with the present application and incorporated herein by reference.

Figure 6:
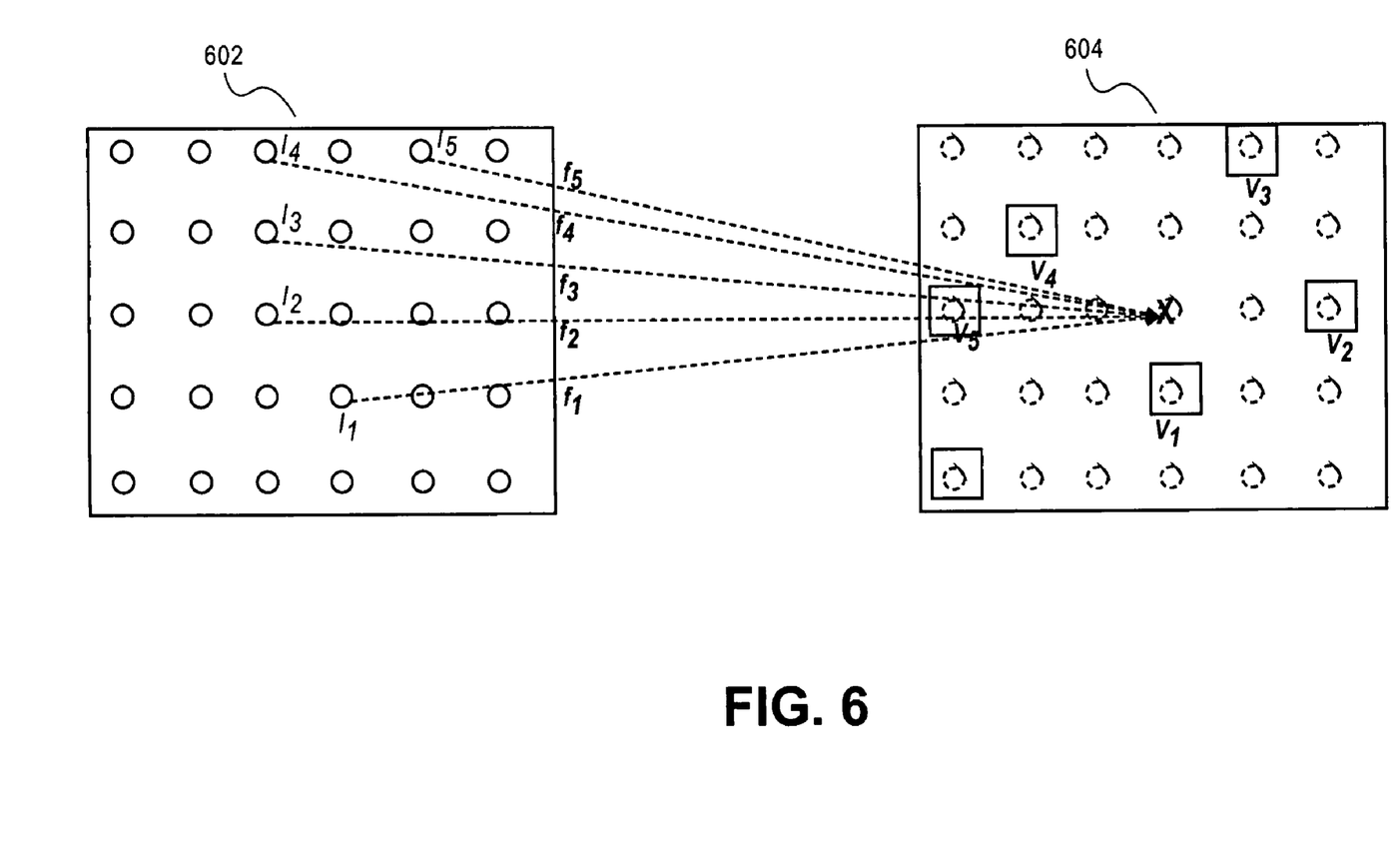
FIG. 6 shows an example of generating a temporal prediction using the method of FIG. 4.

An example of applying the filter to generate the temporal prediction is shown in FIG. 6. Pixels in a reference image 602 are used to predict pixels in a target image 604. The reference pixels are represented by solid lines in reference image 602, and the target pixels to be predicted are represented by dashed lines in target image 604. The filter forms a prediction for pixel x in the target image 604 by using a tap structure of local motion vectors $v_1$ through $v_5$. The motion vectors are local to pixel x because each of their respective AOI cells overlap with at least a portion of the AOI cell for pixel x. Each motion vector $\{v_i\}$ in the tap structure maps to image data $\{I_i\}$ in the reference image 602. The adaptive temporal prediction filter adjusts the reference data $\{I_i\}$ by a filter weight $\{f_i\}$ to predict pixel x.

In one embodiment, the prediction filter uses the tap structure and the filter weights to generate a prediction according to the following equation:

$$\text{Prediction} = I_1*f_1 + I_2*f_2 + I_3*f_3 + I_4*f_4 + I_5*f_5$$

where the filter tap, which is defined by the local motion vectors, and the filter coefficients $\{f_i\}$ are determined when the filter is generated at 430.

Returning to FIG. 4, at 450 the prediction results produced by the filter are used to re-estimate the values of the motion vectors so as to improve the accuracy of the adaptive filter. At 460 if the prediction error needs to be decreased the method returns to 440. Otherwise the method ends at 470. As a result, the prediction error for all pixels in the motion vector's total influence area is reduced. An example of a method to re-estimate the value of a motion vector using the total influence area of the motion vector is described in co-pending U.S. application Ser. No. 11/228,681, entitled ADAPTIVE MOTION ESTIMATION FOR TEMPORAL PREDICTION FILTER OVER IRREGULAR MOTION VECTOR SAMPLES by Marco Paniconi et al., concurrently filed with the present application and incorporated herein by reference.

Figure 7:
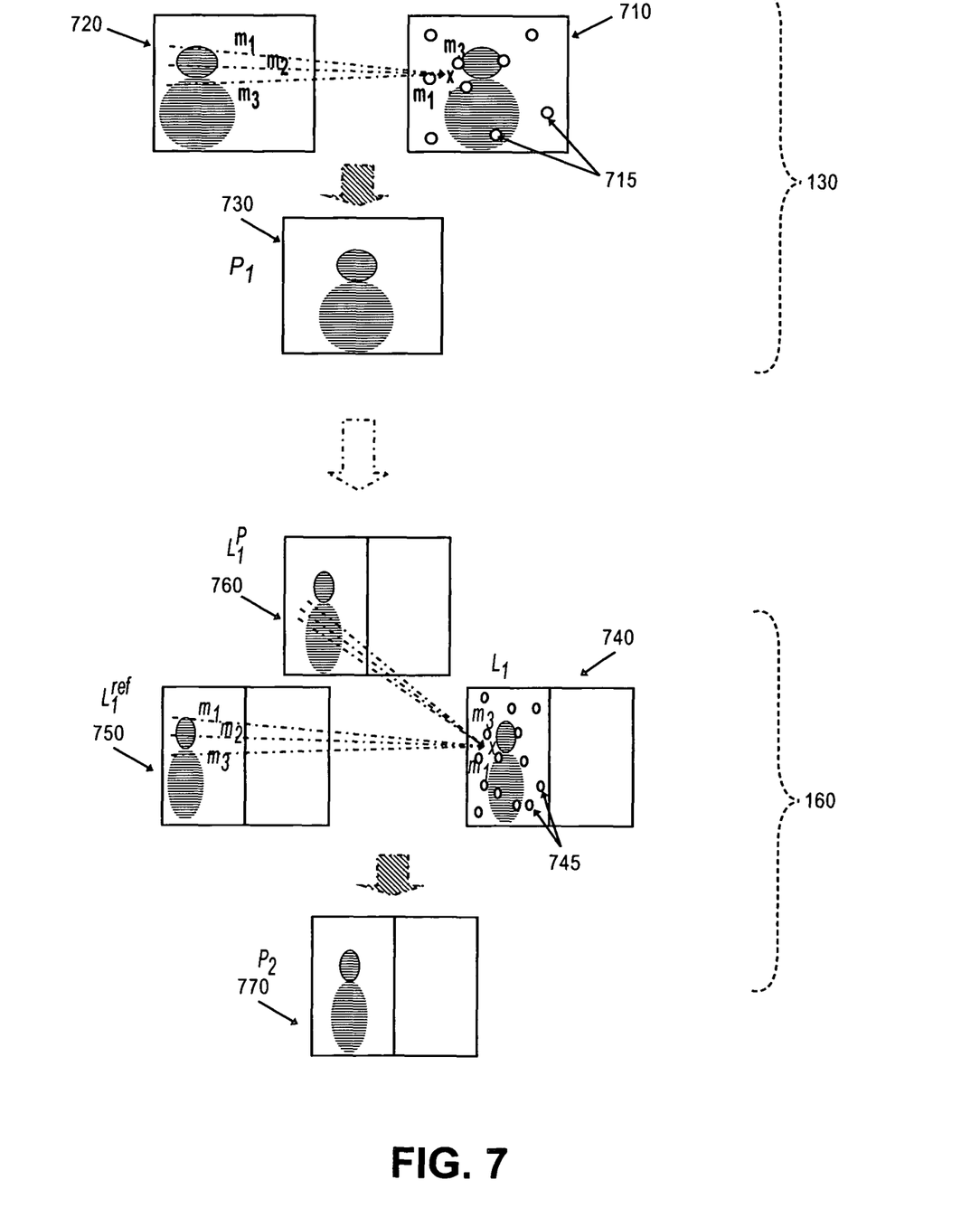
FIG. 7 shows an example of intermediate results produced by generating temporal predictions using the method of FIG. 1.

Referring to 130 and 160 of FIG. 1 in greater detail, an example of intermediate results produced by the adaptive temporal prediction filter is shown in FIG. 7. A reference image 720 and a set of motion vectors 715 in target image 710 are used by an adaptive temporal predictive filter to generate predicted image 730. The adaptive temporal prediction filter applies filter coefficients $\{f_i\}$ to multiple motion vectors $\{m_i\}$ to predict a pixel x in the target image. The prediction filter has the form:

$$P_1(x) = \sum_{i \in S(x)} f_i I^{ref}(x + m_i)$$

where x is a pixel to be predicted, i denotes a particular motion vector, $m_i$ is a value for motion vector i, $f_i$ is a filter coefficient for motion vector i, the set S(x) is the filter tap, and $P_1$ is the first prediction.

The first prediction, the first low pass data of the target image, and the reference image are used to generate the second prediction. In one embodiment, the first prediction and the reference image are filtered by the low pass filter of the spatial-temporal transform to produce low pass data of the first prediction 760 and low pass data of the reference image 750. This action allows the data that is input to the prediction filter to be in a common form. An irregular pattern of motion vectors 745 is applied to the low pass data 740 of the target image, and the second prediction 770 is generated. The adaptive temporal prediction filter uses the reference data from 750 and the first prediction data from 760 to predict a pixel x in the first low pass data 740 of the target image.

Each motion vector used in the second prediction has a value ($m_i$) and a mode map ($p_i$). The mode map is a value between 0 and 1: $p_i \in [0,1]$; in some embodiments $p_i$ is either 0, 1, or ½. The mode map indicates the contribution of the previous prediction to the current prediction. For example, if the mode map is 0, then the value for the motion vector is determined only from data of the reference image. If the mode map is 1, then the value for the motion vector is determined only from data of the previous prediction. If the mode map is ½, then the value of the motion vector is determined from an average of the previous prediction data and the reference image data.

Because the adaptive temporal prediction filter uses the first prediction to generate the second prediction, the filter has the form:

$$P_2(x) = \sum_{i \in S(x)} f_i \left( p_i L_1^{ref}(x + m_i) + (1 - p_i) L_1^P(x) \right)$$

where $p_i$ is the mode map value for motion vector i, $L_1^{ref}$ is the low pass data of the reference image, $L_1^P$ is the low pass data of the first prediction, and $P_2$ is the second prediction.

Figure 8:
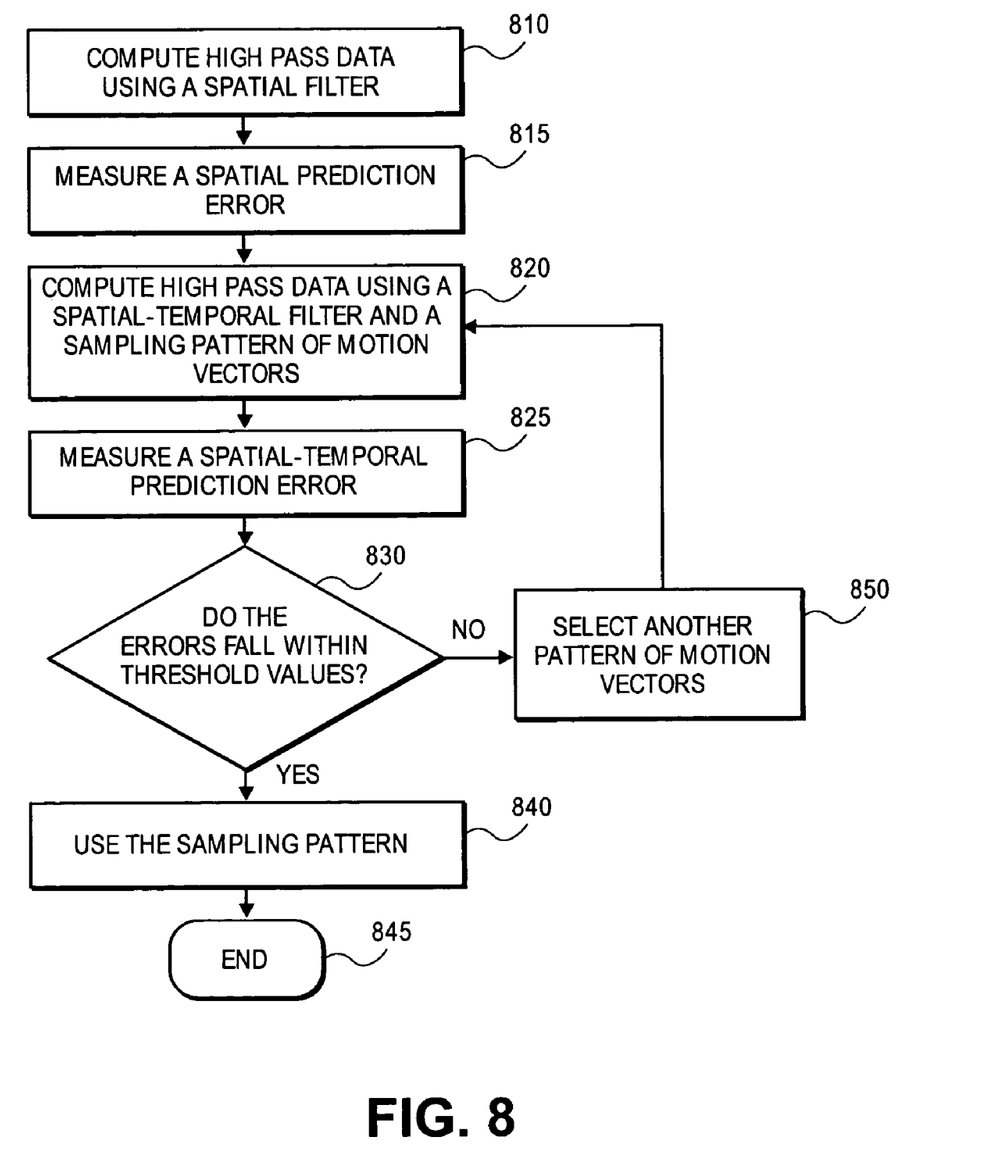
FIG. 8 an example of generating a pattern of motion vectors used by the method of FIG. 1.

Referring to 120, 150, and 180 of FIG. 1 in greater detail, an example of selecting a pattern of motion vectors is shown in FIG. 8. In general, the total bit budget allocated to motion vectors and the number of stages of the spatial-temporal transform are predetermined. In some embodiments, the number of motion vectors used at each stage is also predetermined. The various motion vector sampling patterns which may be used are characterized by the number and type of blocks, because each block has one motion vector. For example, a regular pattern of motion vectors, $MV_1$, is produced using one block shape, such as 16 pixels by 16 pixels. An irregular pattern, $MV_2$, in some embodiments, is produced using three block shapes, such as 8×16, 16×16, and 16×32 pixels. An even more irregular pattern $MV_3$ has six block shapes in some embodiments, such as 8×8, 8×16, 16×16, 16×32, 32×32, and 32×64 pixels. A very irregular pattern $MV_4$ has even more block shapes, such as ten for example.

Given these motion vector sampling patterns $MV_i$, where i represents a particular pattern, and given the number of motion vectors available at each stage, the encoder performs the following actions to determine the sampling pattern at a particular stage n. At 810, high pass data is computed using a spatial filter. In some embodiments, this action is performed by spatially filtering the target image to produce a spatial prediction of high pass data. At 815, the spatial prediction error is measured. The spatial prediction error for high pass data at stage n is denoted as $e_n^{spatial}$. At 820, the high pass data is computed using a spatial-temporal filter with a candidate motion vector sampling pattern $MV_i$. In some embodiments, this action is performed by applying a spatial-temporal filter and a pattern of motion vectors to the target image to produce a spatial-temporal prediction. At 825, the spatial-temporal prediction error is measured. The spatial prediction error for high pass data at stage n is denoted as $e_n^{spatial\_temporal}$. During the first iteration, i is 1, and so the regular sampling pattern $MV_1$ is used. At 830, it is determined whether a difference of the spatial prediction error and the spatial-temporal prediction error is within threshold values. In one embodiment, the determination is made using $$C_{i-1} < |e_n^{spatial} - e_n^{spatial\_temporal}| < C_i$$

where $C_{i-1}$ and $C_i$ are predetermined limits used to control the degree of complexity in the motion vector sampling pattern. For example, if i=1 and $C_0=0$, and $$|e_n^{spatial} - e_n^{spatial\_temporal}| < C_1,$$

then the prediction error does not substantially decrease with the addition of the temporal component. Hence there is no need to use an irregular pattern of motion vectors instead of the regular pattern of $MV_1$. If the conditions are satisfied at 830, then at 840 the candidate pattern is used and the process ends at 845. If the conditions are not satisfied, then at 850 i is incremented by one to select the next pattern of motion vectors as the candidate pattern, and then the process returns to 820.

Figure 9:
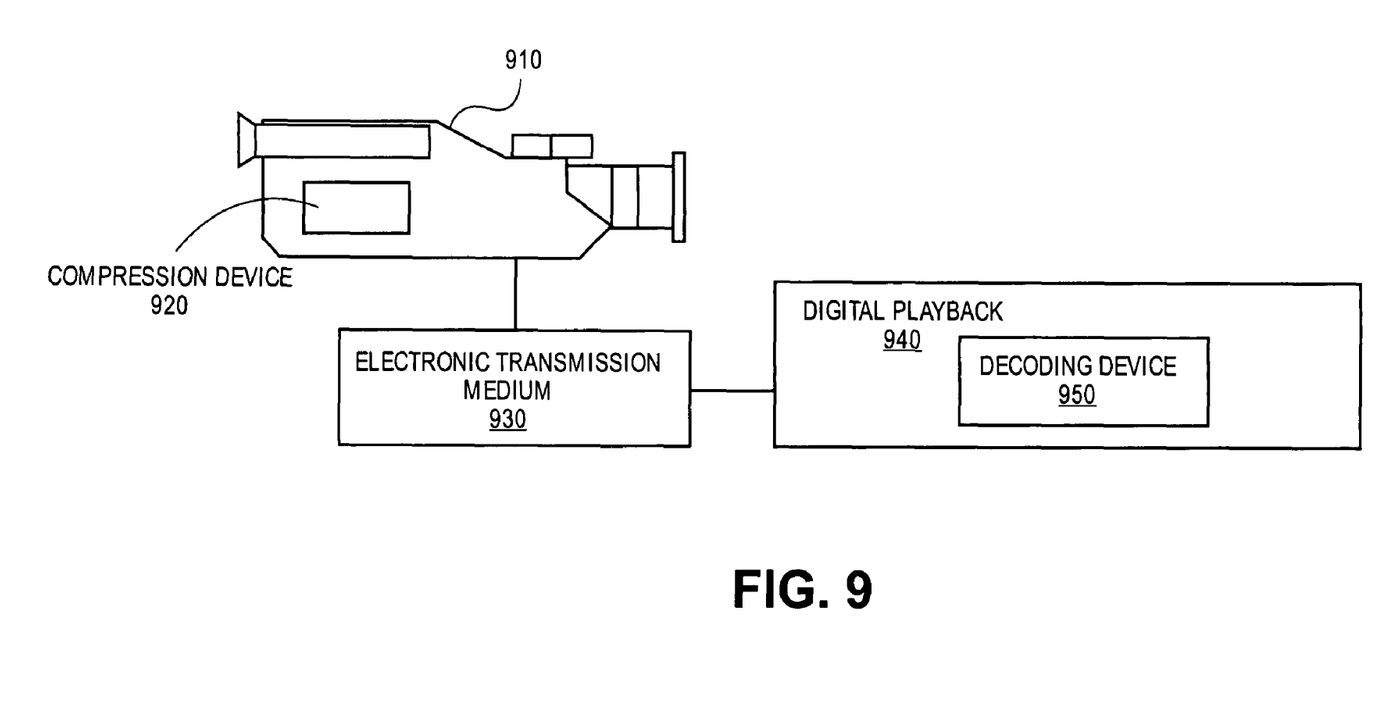
FIG. 9 shows an example of a system that uses the linking method of FIG. 1.

FIG. 9 shows an example of a system that uses the multi-stage linking method. A digital video camera 910 captures images in an electronic form and processes the images using compression device 920, which uses the linking method during the compression and encoding process. The encoded images are sent over an electronic transmission medium 930 to digital playback device 940. The images are decoded by decoding device 950, which uses the method during the decoding process. Camera 910 is illustrative of various image processing apparatuses (e.g., other image capture devices, image editors, image processors, personal and commercial computing platforms, etc.) that include embodiments of the invention. Likewise, decoding device 950 is illustrative of various devices that decode image data.

While the invention is described in terms of embodiments in a specific system environment, those of ordinary skill in the art will recognize that the invention can be practiced, with modification, in other and different hardware and software environments within the spirit and scope of the appended claims.

The invention claimed is:

1. A method carried out by an electronic data processor, comprising:
   receiving target image data;
   applying a multiple stage filtering to the target image data, wherein each stage includes a filtering process comprising:
   spatially filtering the target image to produce a first prediction of the target image;

using the first prediction to determine a first prediction error;

applying a candidate pattern of motion vectors and a spatial-temporal filter to the target image to produce a second prediction of the target image;

using the second prediction to determine a second prediction error; and using the candidate pattern of motion vectors as a motion vector sampling pattern if a difference between the first and second prediction errors is within a predetermined limit;

using the target image data and the motion vector sampling pattern to generate a temporal prediction of the target image data; and using the temporal prediction of the target image data to generate a spatial-temporal transformation of the target image data.

2. The method of claim 1, wherein applying the multiple stage filtering to the target image data comprises:

applying the filtering process to the target image at a first stage; and applying the filtering process to low pass filtered data of the target image at subsequent stages.

3. The method of claim 1, wherein generating the motion vector sampling pattern comprises:

generating a regular motion vector sampling pattern at a first stage; and generating an irregular motion vector sampling pattern at subsequent stages.

4. The method of claim 1, wherein the motion vector sampling pattern at each stage is adapted to a spatial correlation of the target image data at that stage.

5. The method of claim 1, wherein using the motion vector sampling pattern to generate the temporal prediction of the target image at a first stage of the multipole stage filter comprises:

applying a prediction filter comprising $$P_1(x) = \sum_{i \in S(x)} f_i I^{ref}(x + m_i)$$

where $P_1(x)$ is the temporal prediction at the first stage for a pixel x, $S(x)$ is a set of motion vectors for filtering the pixel x, $f_i$ is a filter coefficient weight for a motion vector i in the set $S(x)$, $m_i$ is a value of motion vectors i, and $I^{ref}$ is a reference image.

6. The method of claim 1, wherein using the motion vector sampling pattern to generate the temporal prediction of the target image at a stage after the first stage of the multiple stage filtering comprising:

applying a prediction filter using the motion vector sampling pattern, a reference image, and the temporal prediction from the previous stage.

7. The method of claim 6, wherein the prediction filter comprises:

$$P_n(x) = \sum_{i \in S(x)} f_i \left( p_i L_{n-1}^{ref}(x + m_i) + (1 - p_i) L_{n-1}^P(x) \right)$$

where $P_n(x)$ is the temporal prediction for the stage n and pixel x, $S(x)$ is a set of motion vectors for filtering the pixel x, $f_i$ is the filter coefficient weight for motion vector i in the set $S(x)$, $m_i$ is a value of motion vector i, $L_{n-1}^{ref}$ is low pass filtered data of the referenced image, $L_{n-1}^P$ is low pass filtered data of the temporal prediction from the previous stage, and $p_i$ is a mode map value to determine a contribution from the low pass filtered data from the reference image and the low pass filtered data of the temporal prediction from the previous stage.

8. A non-transitory computer readable medium storing a computer program of instructions which, when executed by a processing system, cause the system to perform a method comprising:

receiving target image data;

applying a multiple stage filtering to the target image data, wherein each stage includes a filtering process comprising:

spatially filtering the target image to produce a first prediction of the target image;

using the first prediction to determine a first prediction error;

applying a candidate pattern of motion vectors and a spatial-temporal filter to the target image to produce a second prediction of the target image;

using the second prediction to determine a second prediction error; and using the candidate pattern of motion vectors as a motion vector sampling pattern if a difference between the first and second prediction errors is within a predetermined limit;

using the target image data and the motion vector sampling pattern to generate a temporal prediction of the target image data; and using the temporal prediction of the target image data to generate a spatial-temporal transformation of the target image data.

9. The non-transitory computer readable medium of claim 8, wherein applying the multiple stage filtering to the target image data comprises:

applying the filtering process to the target image at a first stage; and applying the filtering process to low pass filtered data of the target image at subsequent stages.

10. The non-transitory computer readable medium of claim 8, wherein generating the motion vector sampling pattern comprises:

generating a regular motion vector sampling pattern at a first stage; and generating an irregular motion vector sampling pattern at subsequent stages.

11. The non-transitory computer readable medium of claim 8, wherein the motion vector sampling pattern at each stage is adapted to a spatial correlation of the target image data at the stage.

12. An apparatus comprising:

a microprocessor that receives target image data, and applies a multiple stage filtering to the target data, wherein each stage includes a filtering processes comprising:

spatially filtering the target image to produce a first prediction of the target image;

using the first prediction to determine a first prediction error;

applying a candidate pattern of motion vectors and a spatial-temporal filter to the target image to produce a second prediction of the target image;

using the first prediction to determine a second prediction error; and using the candidate pattern of motion vectors as a motion vector sampling pattern if a difference between the first and second prediction errors is within a predetermined limit;

using the target image data and the motion vector sampling pattern to generate a temporal prediction of the target image data; and using the temporal prediction of the target image data to generate a spatial-temporal transformation of the target image data.

13. The apparatus of claim 12, wherein the microprocessor applies the multiple stage filtering to the target image data by:

applying the filtering process to the target image at a first stage; and applying the filtering process to low pass filtered data of the target image at subsequent stages.

14. The apparatus of claim 12, wherein the microprocessor generates the motion vector sampling pattern by:

generating a regular motion vector sampling pattern at a first stage; and generating an irregular motion vector sampling pattern at subsequent stages.

15. The apparatus of claim 12, wherein the motion vector sampling pattern at each stage is adapted to a spatial correlation of the target image data at that stage.

* * * * *